United States Patent [19]

Ueno et al.

[11] 4,165,658

[45] Aug. 28, 1979

[54] GEAR TRANSMISSION FOR ELECTRICAL OPERATION MEANS

[75] Inventors: Yoshio Ueno; Akio Nagami, both of Kuwana, Japan

[73] Assignee: Hitachi Metals, Ltd., Tokyo, Japan

[21] Appl. No.: 846,224

[22] Filed: Oct. 26, 1977

[30] Foreign Application Priority Data

Oct. 27, 1976 [JP] Japan ................... 51-128372

[51] Int. Cl.$^2$ ........................................... F16H 1/20
[52] U.S. Cl. ................... 74/412 R; 74/414; 74/421 R; 251/248
[58] Field of Search ............ 74/421 R, 414, 412 R; 251/248

[56] References Cited

U.S. PATENT DOCUMENTS

| 642,765 | 2/1900 | Thomson | 74/421 R |
|---|---|---|---|
| 760,218 | 5/1904 | Lefinski | 74/421 R X |
| 1,728,279 | 9/1929 | Ramsey | 74/421 R |
| 2,883,880 | 4/1959 | Merkle | 74/421 R X |
| 3,011,358 | 12/1961 | Moore | 74/421 R X |
| 3,154,963 | 11/1964 | Caley et al. | 74/421 R |
| 3,329,035 | 7/1967 | Herr | 74/421 R X |
| 3,771,381 | 11/1973 | Holzhauser et al. | 74/421 R |
| 3,921,470 | 11/1975 | Mabuchi | 74/414 |

FOREIGN PATENT DOCUMENTS 951321 3/1964 United Kingdom ............ 74/421

Primary Examiner—John J. Camby
Assistant Examiner—Larry I. Schwartz
Attorney, Agent, or Firm—Sughrue, Rothwell, Mion, Zinn and Macpeak

[57] ABSTRACT

A gear transmission for an electrical operation means is disclosed wherein a reduction gear mechanism is provided to reduce valve opening and closing speed. The gear box has a cylindrical shape in which upper and lower plates support two gear shafts which rotatably support a plurality of pairs of large and small gears. The large gear is integrally and coaxially secured to the small gear in each pair. A small gear of a first pair of gears supported by one of the gear shafts is engaged with a large gear of a second pair of gears supported by the other gear shaft. The small gear of the second pair is in turn engaged with a large gear of a third pair of gears supported by the one of the gear shafts. The third pair of gears is rotated about the one of the gear shafts independent of the rotation of the first pair of gears. This gear transmission is successively achieved between the two shafts dependent on the numbers of pairs of gears to realize the reduction gear mechanism, and the rotation of the motor shaft is transmitted to the transmission output shaft provided in the box, whose rotation is transmitted to a valve rod for opening and closing the valve.

9 Claims, 6 Drawing Figures

GEAR TRANSMISSION FOR ELECTRICAL OPERATION MEANS

BACKGROUND OF THE INVENTION

The present invention relates to an electrical operating means, and more particularly, to a gear transmission for an electrical gear box adapted to be used for opening and closing valve means.

In slice valves and globe valves, several or more than ten manual rotations of a handle is required to open and close these valves, whereas in butterfly valves and ball valves, only a quarter turn of the valve shaft is required for opening and closing the valves, which is extremely convenient. However, in these butterfly or ball valves, since the opening and closing operation of the valves can be immediately achieved, the flowing condition of fluid or fluid pressure is immediately changed resulting in disadvantageous water hammer phenomena occurring in a fluid passage. Therefore, it is necessary to reduce the opening and closing speed of the valve by an electrical operating means at a reduction ratio range of 1/1000 to 1/4000. The reduction ratio is 20 to 100 times larger than that required for a slice valve or globe valve.

FIG. 1 shows a conventional gear transmission including a gear box 5 and which is adapted to be used in an electrical operator for decelerating transmitting rotation of a motor shaft to an output shaft. Six stages of spur gers are provided to obtain a reduction ratio of 1/2000. The rotation of a motor 1 is successively decelerated from first stage gears 2a and 3a through sixth stage gears 2f and 3f to operate the valve by an finally decelerated output shaft C connected to a valve shaft by means of a coupler (not shown).

Gear module number as defined by Japanese Industrial Standard JIS B1701 is determined by the following formula:

$$M = d/z$$

wherein
- M: module number in mm
- d: diameter of standard pitch circle in mm
- z: number of gear teeth The module number of the gears 2a and 3a of the first stage is in a range of 0.4 to 1 and the teeth width thereof is in a range of 2 to 4 mm. The module of the gears 2f and 3f of the sixth stage is in a range of 1.5 to 3 and the teeth width thereof is in a range of 15 to 30 mm. The diameter of each of gear shaft 4a to 4e and C is increased in turn.

With this structure, since there are six shafts in the gear box 5, the size of the box is large in comparison with the motor housing 1, so that the total size of the operation means becomes large, which is troublesome for installing the operation means in actual piping work, particularly above the valve portion. In order to provide an anti-explosion type operating means, the gear box is desirably cylindrical to ensure the necessary clearances, for example, a clearance between the motor shaft and a hole formed in the upper supporting plate to receive the shaft. The cylindrical gear box is also desirable in view of the size of bearings, threaded holes for securing the motor and the relationship of fixing and supporting upper and lower plates of the gear box. However, according to the conventional device, the shape of the box is required to be rectangular in order to provide the most compact structure, since generally a large space is required if a cylindrical box is proposed.

SUMMARY OF THE INVENTION

It is therefore an object of the present invention to overcome the above-mentioned drawbacks and disadvantages and to provide an improved gear transmission for an electrical operating means for opening and closing valves by a quarter rotation of the valve shaft with a simple and compact structure of the gear box.

Another object of the present invention is to provide a gear meshing arrangement having high mechanical strength to sustain large mechanical stress when the rotation of the transmission output shaft is prevented by an external force while the motor is energized.

Still another object of the present invention is to provide an improved operating means wherein speed change gearing is provided to control the rotation speed of the output shaft.

Briefly, according to the present invention, upper and lower plates support two gear shafts which rotatably support a plurality of pairs of large and small gears. The large gear is integrally and concentrically secured to the small gear in each pair. A small gear of first pair of gears supported by one of the gear shafts is meshed with a large gear of a second pair of gears supported by the other of gear shaft. The small gear of the second pair is meshed with a large gear of a third pair of gears supported by the one of the gear shafts. The third pair of gears is rotated about the one of the gear shafts independent of the rotation of the first pair of gears. This gear transmission is successively achieved between the two shafts dependent on the number of the pairs of gears to realize a gear reduction mechanism, and the rotation of the motor shaft is finally transmitted to the transmission output shaft whose rotation is reduced by the reduction gear mechanism.

Further, according to the present invention, a manual shaft is provided which engages with the transmission output shaft to manually operate the electrical valve operating means.

DETAILED DESCRIPTION OF THE PREFERRED EMBODIMENTS

Figure 1:
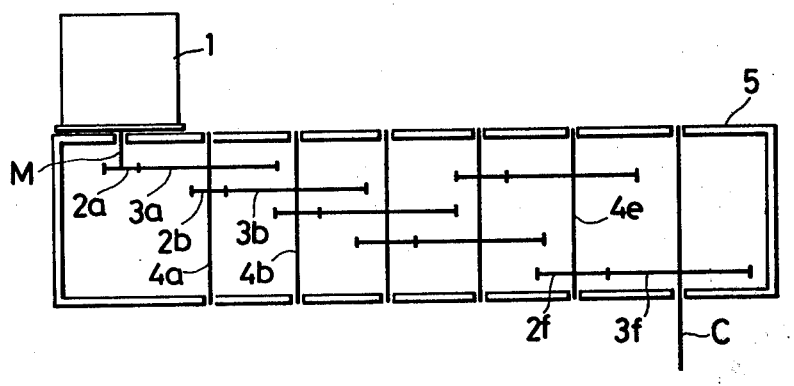
FIG. 1 is a cross-sectional schematic view showing the conventional gear box adapted to be used in the electrical valve operating means.

A first embodiment of the invention will now be described in detail with reference to FIGS. 2 and 3, wherein a motor output shaft M is provided with a small gear 7 which engages large gear 8. The large gear 8 is fixedly secured to a small gear 9 by a key, and both large and small gears 8 and 9 are rotatable on a shaft A. The small gear 9 is meshed with a large gear 10 which is fixedly secured to a small gear 11 and rotatable on a shaft B together with the small gear 11. In the same manner, the gear rotation is transmitted through gears 12 and 13 on shaft A, 14, 15 on shaft B and 16,17 on shaft A to function as reduction gear mechanism. The small gear 17 integrally rotated with the large gear 16 is meshed with a large gear 18 fixedly secured to an output shaft C to rotate the output shaft C. One end 20 of the output shaft C transmits the reduced rotation to a driven member, for example a valve rod, by means of a coupler (not shown). The module of gears 7 and 8 is in a range of 0.4 to 1 and gear teeth width thereof is in a range of 2 to 4 mm. The module of final gears 17 and 18 is in a range of 1.5 to 4 and gear teeth width thereof is in a range of 15 to 40 mm. Between the gears 9 and 16, the module and gear teeth width is in turn increased. Since the distance between the centers of the gear 9 and the gear 10 is equal to the distance between the centers of the gears 11 and 12, the gears 13 and 14, and the gears 15 and 16, namely the distance is equal to the distance $L_2$ between the shafts A and B, the distance is a common multiple of the module number of each of the gears. With this structure, the number of gear shafts can be reduced, and a compact gear box results.

The large gear 18 is meshed with a small gear 19 secured to a shaft D to rotate the shaft D. A cam 22 is provided on the shaft D to actuate a micro switch (not shown) for directly or indirectly deenergizing the motor upon quarter rotation of the output shaft C. Further, the shaft D is utilized so as to provide input signal for opening of the valve if desired, and also utilized as a manual operation shaft. Therefore, the rotation of the shaft D is less than one full rotation, upon a quarter rotation of the shaft C in order to terminate the rotation of the shaft C by the actuation of the micro switch, so that the gear teeth number of the large gear 18 should be four times less than that of the small gear 19.

In case of application of above-mentioned electrical valve operation means with a slice valve or globe valve having a small opening, a micro switch is actuated by an unrotatable and reciprocated cam threadingly engaged with a cam receiving portion 21 of the shaft D.

Alternatively, the pair of gears 16 and 17 is fixedly secured to or integral with the shaft A, and the pair of gears 14 and 15 are fixedly secured to or integral with the shaft B, and the shafts A and B are rotatably secured to the upper and lower supporting plates 23 and 24 by means of bearings. The pairs of gears may be prevented from vertical sliding movement on the shafts by stepped portions on the shafts. The shafts C and D are rotatably secured to the upper and lower supporting plates 23 and 24. The upper and lower plates 23 and 24 are connected with each other by a side wall 29 or other suitable means to form the gear box.

Figure 3:
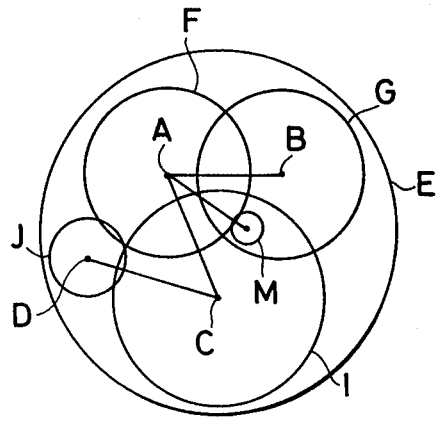
FIG. 3 is a top schematic view showing the embodiment of FIG. 2.

Reference is made on FIG. 3 wherein a plurality of pairs of gears are housed in a cylindrical gear box. Circle E defines the inner peripheral surface of the cylindrical gear box. The diameter of the circle E is required to be small but is determined in light of the size of the motor, size of the cam 22 provided to the shaft D, size of the micro switch, condenser for starting the motor (not shown) and wiring. Specifically, the diameter of the circle E is one and half to twice as large as that of the motor. Circles F and G designate maximum sizes of the gears (addendum circle) secured to the shafts A and B, respectively. Circles I and J designate sizes of the small gear 18 and the large gear 19, respectively. The circles F, G and I are required to be large within the circle E to obtain a high gear reduction ratio and to obtain large torque. The circle J is required to be small satisfying the above-mentioned gear teeth number relationship within the circle E, and the motor can be provided on a desired place of the upper supporting plate 23. Preferably, the position is determined at a place where the large diameter of the gear 8 is contemplated but excepting the position where cam 22 for actuating the microswitch may be interfered with by the motor.

One of the Examples showing gear arrangement is shown in Table 1.

Table 1

| module (mm) | | 0.5 | 0.5 | 0.5 | 1 | 1 | 1.5 |
|---|---|---|---|---|---|---|---|
| large gear | gear number in the drawings | 8 | 10 | 12 | 14 | 16 | 18 |
| | number of gear teeth | 80 | 80 | 80 | 38 | 38 | 30 |
| | diameter (mm) | 41 | 41 | 41 | 40 | 40 | 48 |
| small gear | gear number in the drawings | 7 | 9 | 11 | 13 | 15 | 17,19 |
| | number of gear teeth | 11 | 20 | 20 | 12 | 12 | 10 |

The gear reduction ratio obtained by the gear arrangement according to the Table 1 is 1/3500. The diameters of large gears secured to the shafts A and B are approximately equal with each other and these gears are so designed that the reduction ratio becomes small and large torque can be provided as the module number is increased. If a smaller reduction ratio is required, the gear-reduction ratio presented by the combination of the gears 9, 10 and 11,12 is changed.

Figure 2:
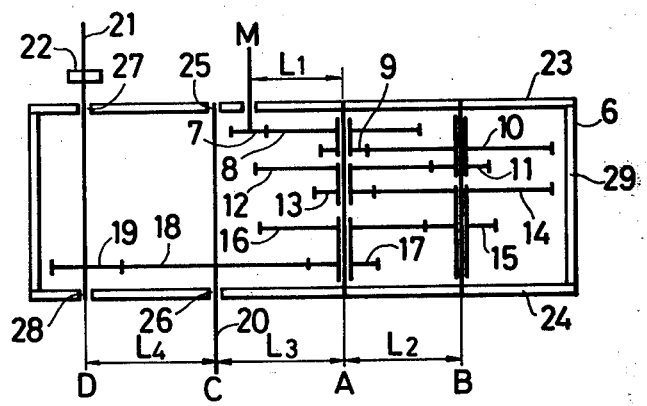
FIG. 2 is a cross-sectional schematic view showing the first embodiment of the gear box according to the present invention.
Figure 4:
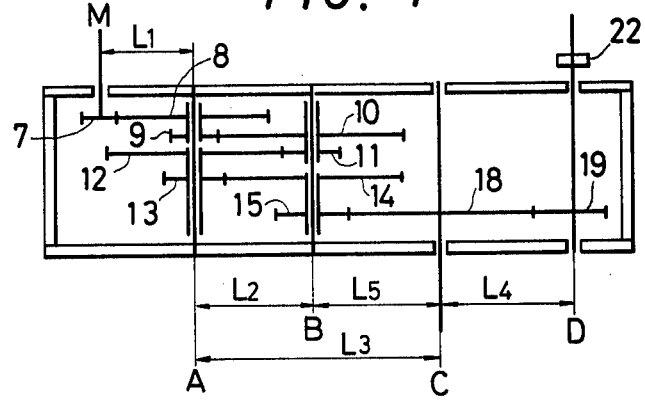
FIG. 4 is a cross-sectional schematic view showing the second embodiment of the gear box according to the present invention.

In FIG. 2 reduction is achieved by six stages of gears. It is also possible to eliminate one of the stages as shown in the second embodiment shown in FIG. 4 to provide the gear reduction ratio. In this case, the distance $L_3$ between the shafts A and C is required to be equal to the distance $L_5$ between the shafts B and C; alternatively, the gear teeth ratio between the shafts A, B and the shafts B, C must keep constant. Further, the distance $L_1$ between the shafts M and A is required to be equal to the distance between the shafts M and B; alternatively, the gear teeth ratio should be maintained constant between the gears. With this structure, the function of gears as shown in FIG. 2 (six stages) and the function of gears as shown in FIG. 4 (five stages) can be simultaneously fulfilled by simply shifting the gear-meshing arrangement.

Various experiments were conducted to obtain a fundamental gear box arrangement. In order to provide gears within almost the full space of the cylindrical box and to obtain high mechanical strength, the distance $L_2$ between the shafts A and B is in a range of 28 to 34% of the diameter of the circle E, and the distance $L_3$ between the shafts A and C or the distance $L_5$ between the shafts B and C is 35 to 40% of the diameter of the circle E. The distance $L_3$ or $L_5$ is about 1.03 to 1.4 times larger than the distance $L_2$, and the maximum module number is 2 to 7 times larger than the minimum module number. The most important factor is the distance $L_2$. Other factors can be determined once the factor $L_2$ is determined.

Figure 5:
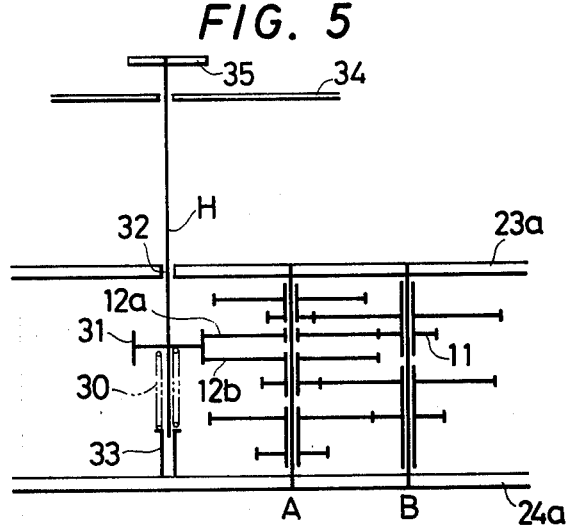
FIG. 5 is a cross-sectional schematic view showing the third embodiment of the gear box according to the present invention; and, FIG. 6 is a top schematic view showing the embodiment of FIG. 5.
Figure 6:
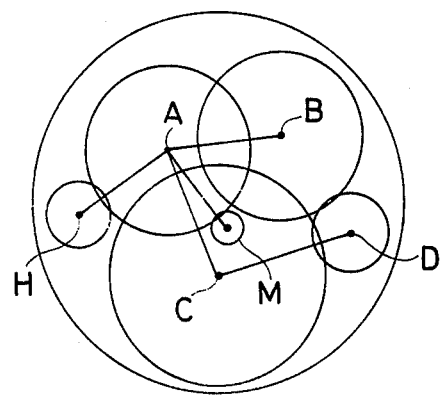

The third embodiment according to the present invention will next be described with reference to FIGS. 5 and 6, wherein manual operation is further achieved with the simple modification of the embodiment as shown in FIG. 2. In FIG. 5 only shafts A and B and the manually operating shaft H are shown, and the motor shaft M, the output shaft C and the shaft D are omitted for simplicity.

The manually operated shaft H provides a small gear 31 having wide width, which is urged upwardly to engage with divided large gears 12a and 12b by the biasing force of the spring 30 in the normal automatic electrical operating condition. The manual shaft H is rotatably secured to the supporting plates 23a and 24a by bearings 32 and 33. The shaft H is vertically slidable by pressing a handle 35 provided above a casing 34.

In normal automatic electrical operation, the rotation of the motor shaft M is transmitted to the output shaft C through the small gear 11, large gear 12a, the small gear 31, the large gear 12b and the gears as also shown in FIG. 2. In the manual operation, the handle 35 is pressed downwardly against the biasing force of the spring 30 to disengage the small gear 31 with the large gear 12a, during the state of which manual rotation of the handle 35 transmits through the small gear 31 and the large gear 12b to rotate the output shaft without rotating the motor. In this embodiment, since the shaft H is not divided but integrally projected through the casing 34, the handle 35 is rotated during the normal electrical operation. It is also possible to provide the handle whose rotation is prevented during the electrical operation by dividing the shaft H. The handle rotation is only transmitted to the small gear 31 upon pressing the handle during the manual operation by a suitable linking means of the divided shaft H. Further, according to the present invention, it is also possible to divide the large gear 16 into two gears to manually operate the device. Incidentally, in case of the large gears 14 or 10 is divided into two gears for the purpose of manual operation, the direction of the rotation of the handle is opposite to that of the rotation of the output shaft.

Furthermore, the shaft H can be used only for switching manual operation from an automatic electrical operation or vice versa by pressing the shaft for manual operation or by releasing the shaft for automatic operation, while the shaft D is extended through the casing 34 to provide a handle to obtain a manual rotating operation for controlling valve opening.

Reference is made to the anti-explosion structure of the electrical operating means according to the present invention. In the anti-explosion structure, generally, clearance having a predetermined length is required to prevent a flame from running through and escaping from the box. The clearance may be provided at the connecting portion between the members such as between the upper supporting plate 23 and the side plate 29, between the lower supporting plate 24 and the side plate 29, and between the casing of the motor and the plates 23 and 29. Such clearance can be easily obtained because of the cylindrical structure of the gear box. Further, steel plate is employed for the side plate 29 and the casing of the motor to obtain high mechanical strength.

In view of the foregoing, according to the present invention, a compact electrical operating means adapted to be used for opening and closing a valve controlled by the quarter rotation can be obtained. Further, an economical gear box can be obtained since the number of gear shafts is reduced. Furthermore, the gear-reduction ratio can be easily changed and clearance for preventing explosion of the box can be easily obtained.

What is claimed is:

1. A gear transmission for an electrical operation means adapted to be used for opening and closing a valve, including a motor and an output shaft of said motor comprising:
   (a) a generally cylindrical gear box including upper and lower supporting plates,
   (b) first and second gear shafts fixedly secured to said upper and lower supporting plates of said gear box,
   (c) a first plurality of pairs of large and small gears rotatably mounted on said first gear shaft, said large and small gears in each pair being integrally and coaxially secured to one another, and each pair being independently rotatable about said first gear shaft, (d) a second plurality of pairs of large and small gears rotatably mounted on said second gear shaft, said large and small gears in each pair being integrally and coaxially secured to one another, and each pair being independently rotatable about said second gear shaft, a large gear of one of said pairs rotatably mounted on said first gear shaft being engaged with a gear attached to said output shaft of said motor, each small gear of said pairs rotatably mounted on one of said gear shafts being engaged with a large gear of said pairs rotatably mounted on the other of said gear shafts to form a reduction gear mechanism,
   (e) a first transmission output shaft rotatably supported by said upper and lower supporting plates and a gear fixedly attached to said first transmission output shaft, said gear being engaged with a small gear of the final pair of gears of said reduction gear mechanism to rotate said first transmission output shaft, and
   (f) a second transmission output shaft rotatably supported by said upper and lower supporting plates, said second transmission output shaft having fixedly attached thereto a small gear engaged with said gear fixedly attached to said first transmission output shaft.

2. A gear transmission as claimed in claim 1, wherein said reduction gear mechanism is formed in six stages between said output shaft of said motor and said first transmission output shaft.

3. A gear transmission as claimed in claim 1, wherein said reduction gear mechanism is formed in five stages between said output shaft of said motor and said first transmission output shaft.

4. A gear transmission as claimed in claim 1, wherein the distance between said first gear shaft and said first transmission output shaft is equal to the distance between said second gear shaft and said first transmission output shaft.

5. A gear transmission as claimed in claim 1, wherein the gear teeth ratio between said gears mounted on said first gear shaft and said gear fixedly attached to said first transmission output shaft is equal to the gear teeth ratio between said gears mounted on said second gear shaft and said gear fixedly attached to said first transmission output shaft.

6. A gear transmission as claimed in claim 1, further comprising a cam secured to said second transmission output shaft adapted to actuate a microswitch for deenergizing said motor.

7. A gear transmission as claimed in claim 1, further comprising manual operating means which comprises a manual operation shaft vertically movable with respect to said gear box and a gear fixedly secured to said manual operation shaft, said gear being engagable with said one of said pairs of gears secured to said first or second gear shafts, whereby manual rotation of said manual operation shaft is transmitted to said first transmission output shaft through said gear and said pairs of gears.

8. A gear transmission as claimed in claim 1, further comprising a means for controlling opening angle of said valve, said means being secured to said second transmission output shaft.

9. An electrical operation means as claimed in claim 7, wherein said manual operation shaft is used only for switching from electrical operation to manual operation, and said second transmission output shaft is used for manual operation through said pairs of gears.

* * * * *